W. B. EREKSON.
FISH SCREEN.
APPLICATION FILED JULY 27, 1909.
951,635.
Patented Mar. 8, 1910.
2 SHEETS—SHEET 1.
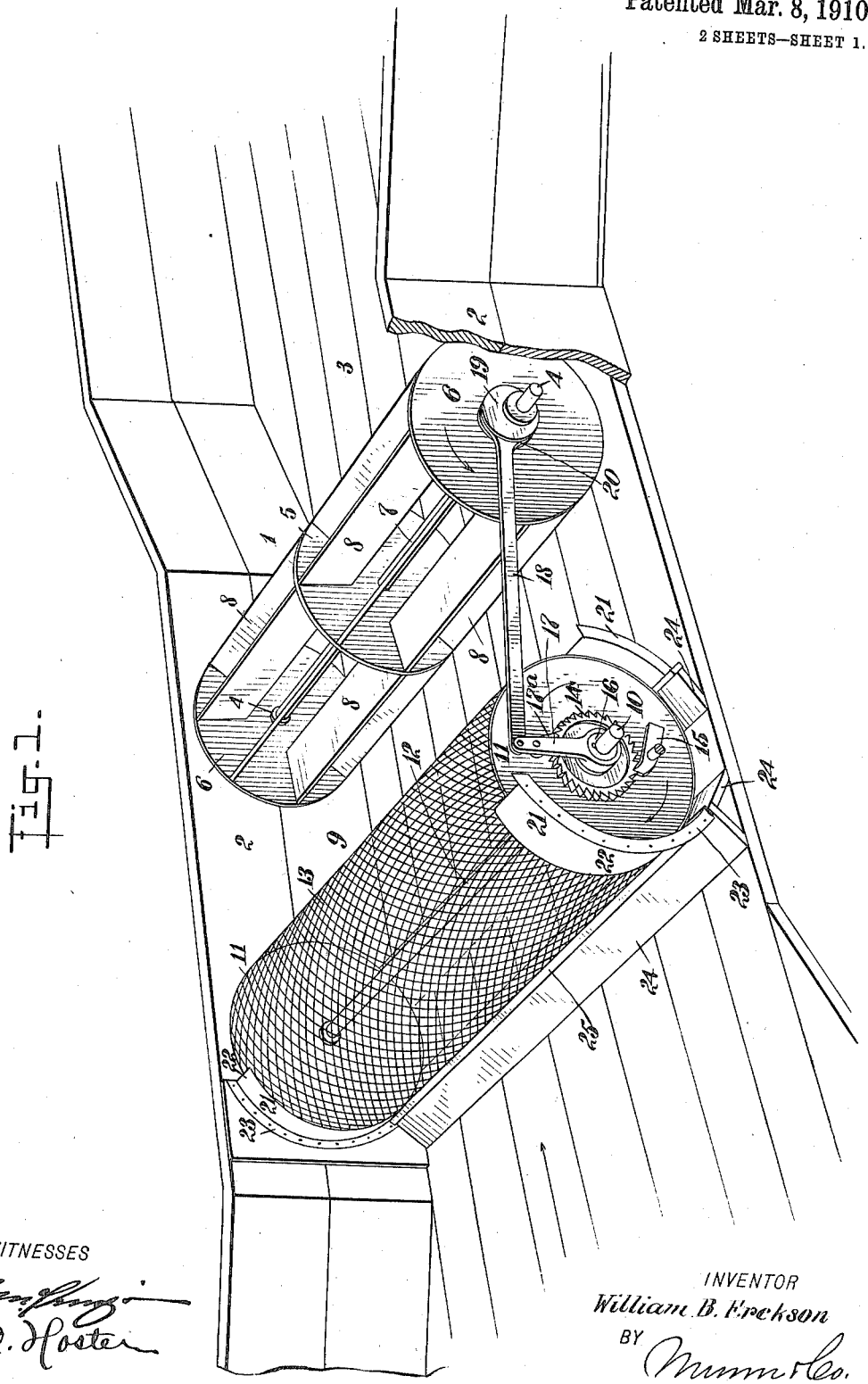
Fig. 1.
WITNESSES
INVENTOR
William B. Erekson
BY
Munn & Co.
ATTORNEYS

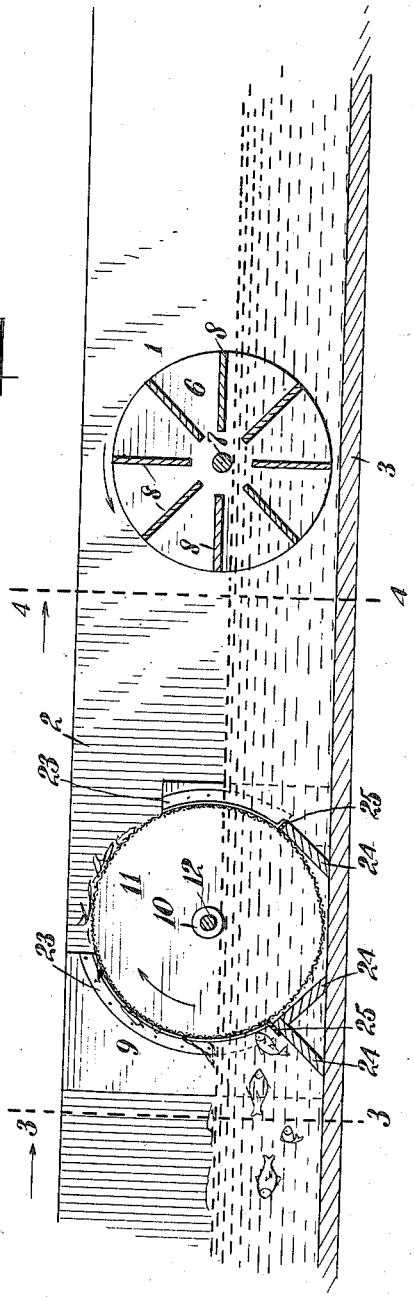
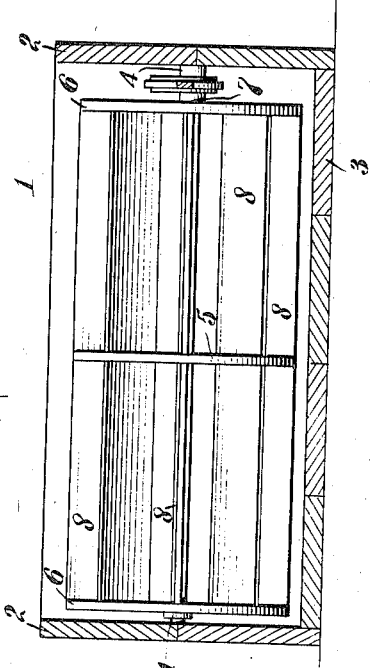
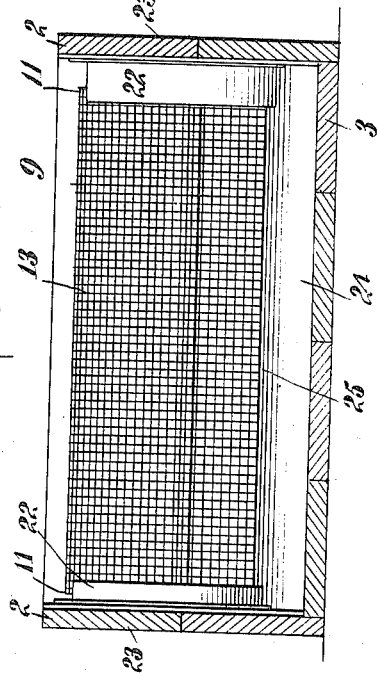

UNITED STATES PATENT OFFICE.

WILLIAM B. EREKSON, OF SALT LAKE CITY, UTAH.

FISH-SCREEN.

951,635.  Specification of Letters Patent.  Patented Mar. 8, 1910.

Application filed July 27, 1909. Serial No. 509,799.

*To all whom it may concern:*

Be it known that I, WILLIAM B. EREKSON, a citizen of the United States, and a resident of Murray, Salt Lake City, in the county of Salt Lake and State of Utah, have invented a new and Improved Fish-Screen, of which the following is a full, clear, and exact description.

My invention relates to fish screens, and its object is to provide a self-cleaning fish screen for use in hatcheries, irrigating ditches, and any small stream, and so placed and constructed as to effectively prevent fish from passing through the screen and meeting destruction when the water supply is diminished or shut off. It likewise performs the function of continually carrying moss, leaves, twigs, and all debris over the top of the screen and depositing the same in the stream below, where it is washed away by the water passing through the screen, thereby preventing the backing up of any debris against the screen and diminishing the flow of water.

My invention further relates to certain details in the construction of fish screens, the purpose of which is to increase the general efficiency of fish screens.

One embodiment of the present invention is disclosed in the structure illustrated in the accompanying drawings, in which like characters of reference denote corresponding parts in all the views, and in which—

Figure 1 is a perspective view of my invention as applied, parts being broken away to disclose the underlying structure; Fig. 2 is a longitudinal sectional view of the same; Fig. 3 is a sectional view on the line 3—3 of Fig. 2, looking in the direction of the arrow; and Fig. 4 is a sectional view on the line 4—4 of Fig. 2 looking in the direction of the arrow.

The paddle wheel 1, suitably mounted in the sides 2 of the sluiceway 3, by means of bearings 4, comprises a center brace 5 and similar circular ends 6, connected by a rod 7 and having mounted thereon paddles 8, 8, the said paddles being so placed as to rotate the paddle wheel 1 when the paddles 8, 8, contact with the water running through the sluiceway 3. At a distance from the paddle wheel 1 is a fish screen 9, mounted similarly to the paddle wheel 1, in the sides 2 of the sluiceway 3, by means of the bearings 10. Two similar ends 11 are oppositely and fixedly mounted upon a rod 12 and upon the ends 11 is secured a cylindrical screen 13 of any conveniently sized mesh.

Secured to one end of the screen 9 and forming a part thereof is a ratchet 14, and fastened to the side of the sluiceway nearest to the ratchet is a pawl 15, engaging the ratchet 14, the combination of the two forming a simple pawl and ratchet mechanism. Loosely attached to the collar 16 of the ratchet 14 is a rod 17 having thereon a pawl 17ª for engagement with the ratchet 14, and pivoted to the said rod 17 is a rod 18 one end of which constitutes an eccentric 19 on the axle of the paddle wheel 1, at the point 20, as conveniently shown in Fig. 1.

Secured to the sides 2 of the sluiceway 3, are side guards 21, comprising flaps 22, and an attaching portion 23, the flaps 22 of the guards 21 contracting with the circular screen 13, thereby preventing any fish from slipping between the circular ends 11 of the screen 13 and the sides 2 of the sluiceway 3.

Secured to the floor or bottom of the sluiceway 3 are boards 24 having thereon a strip of rubber 25 which contacting with the circular screen 13 along its entire length, prevents any fish from slipping beneath the circular screen 13 and facilitates the removal of all debris from this side of the screen.

The operation of my device is as follows: The water running through the passage or sluiceway 3, as indicated by the arrow passes through the circular screen 9 and contacting with the paddles 8 of the paddle wheel 1, causes the same to rotate in the direction indicated by the second arrow. This rotating movement is then transmitted by means of the eccentric 19, the rod 18 and the rod 17 to the pawl and ratchet mechanism, which in turn imparts to the screen 9 an intermittent rotating movement. The side guards 21 and the rubber strip 23 attached to the guards 24 contact with the circular screen 13, and prevent the fish swimming with the current from passing into the stream below the circular screen 13, but all debris such as moss, twigs, leaves, etc., upon striking the circular screen 13 contact therewith and are carried around by the said screen to the stream below, where the running water again takes hold of the said debris and carries it through the paddle wheel into the fields or in whatever direction the water is running.

By imparting to a fish screen an intermittent motion such as described, all debris coming down the stream is enabled to secure a better hold upon the circular wire screen than if the motion were constant. Furthermore, by reason of the intermittent motion the side guards act as protectors to all the fish and prevent the fish from injuring themselves by coming in contact with the screen. It will be understood that the motion imparted to the fish screen by the paddle wheel can be of any desirable speed, so that the screen will revolve a great deal slower than the paddle wheel, said function being very necessary in the use of fish screens.

Having thus described my invention, I claim as new and desire to secure by Letters Patent:

1. A fish screen for canals, ditches, etc., comprising a revoluble screen, longitudinal members angularly disposed on both sides of the screen, segmental side members engaging the periphery of the screen on both sides of the same, and means for intermittently rotating the said screen.

2. A fish screen for canals, ditches, etc., comprising a revoluble screen, longitudinal members angularly disposed on both sides of the screen and comprising a body portion and an extended portion engaging the screen, segmental side members engaging the periphery of the screen and comprising a body portion, and an extended portion, and means for intermittently rotating the said screen.

3. A fish screen for canals, ditches, etc., comprising a revoluble screen, side members engaging the periphery of the screen, longitudinal members comprising a body portion and an extended portion for engagement with the screen, a pawl and ratchet mechanism secured to the shaft of the said screen and disposed on one end of the same, and an eccentric having one end thereof connected to the said pawl and ratchet mechanism and the other end thereof connected with means for rotating the screen.

4. A fish screen for canals, ditches, etc., comprising a revoluble screen, means for intermittently rotating the said screen, side members engaging the periphery of the said screen, and longitudinal members comprising a body portion and an extended portion for engagement with the said screen, substantially as and for the purpose described.

5. In a fish screen for canals, ditches, etc., the combination of a revoluble screen, means for intermittently rotating the said screen, comprising a pawl and ratchet mechanism secured to the shaft of the screen and disposed at one end of the same and an eccentric having one end thereof connected to the said pawl and ratchet mechanism and the other end thereof connected to driving means, longitudinal members angularly disposed on both sides of the screen and comprising a body portion and an extended portion for engagement with the said screen, and segmental side members on both sides of the said screen, comprising a body portion and an extended portion for engagement with the periphery of the said screen.

In testimony whereof I have signed my name to this specification in the presence of two subscribing witnesses.

WILLIAM B. EREKSON.

Witnesses:
  VILATE DAVIS,
  DAVID W. MOFFAT.